United States Patent
Newsome et al.

(10) Patent No.: US 10,081,311 B1
(45) Date of Patent: Sep. 25, 2018

(54) ICE AND SNOW RETENTION SYSTEM FOR VEHICLES

(71) Applicants: Samuel C. Newsome, King, NC (US); Justin C. Newsome, Rural Hall, NC (US)

(72) Inventors: Samuel C. Newsome, King, NC (US); Justin C. Newsome, Rural Hall, NC (US)

( * ) Notice: Subject to any disclaimer, the term of this patent is extended or adjusted under 35 U.S.C. 154(b) by 33 days.

(21) Appl. No.: 15/476,236

(22) Filed: Mar. 31, 2017

Related U.S. Application Data

(63) Continuation of application No. 14/737,089, filed on Jun. 11, 2015, now Pat. No. 9,630,571.

(51) Int. Cl.
*B60R 13/00* (2006.01)
*B60R 11/00* (2006.01)

(52) U.S. Cl.
CPC ......... *B60R 13/00* (2013.01); *B60R 2011/004* (2013.01); *B60R 2011/0063* (2013.01); *B60R 2011/0077* (2013.01)

(58) Field of Classification Search
CPC ............... B60R 13/00; B60R 2011/004; B60R 2011/0077; B60R 2011/0063
USPC ....................................................... 296/1.07
See application file for complete search history.

(56) References Cited

U.S. PATENT DOCUMENTS

| | | | |
|---|---|---|---|
| 6,070,368 A | 6/2000 | Anderson | |
| 6,266,929 B1 | 7/2001 | Cline | |
| 6,318,028 B2 | 11/2001 | Alley | |
| 7,783,400 B1* | 8/2010 | Zimler | B60S 1/0866 219/202 |
| 7,997,032 B2 | 8/2011 | Riley et al. | |
| 8,470,414 B2* | 6/2013 | Custer | B60R 13/00 280/762 |
| 8,910,427 B2 | 12/2014 | Clisset | |
| 9,855,920 B2* | 1/2018 | Castello | B60S 1/026 |
| 2010/0192479 A1* | 8/2010 | Elliott | E04D 13/103 52/24 |
| 2011/0006049 A1* | 1/2011 | Thompson, Jr. | H05B 3/36 219/202 |
| 2014/0318032 A1 | 10/2014 | McCarthy | |

FOREIGN PATENT DOCUMENTS

| | | |
|---|---|---|
| JP | 2008094338 | 10/2006 |
| JP | 2010069894 | 9/2008 |

OTHER PUBLICATIONS https://www.chargespeedusa.com/subaru-body-kits/2006-2007-subaru-impreza-wrx-gd-hoods-access/impreza-wrx-carbon-roof-vane-wing : Jul. 21, 2016.

* cited by examiner

*Primary Examiner* — Pinel E Romain
(74) *Attorney, Agent, or Firm* — Womble Bond Dickinson (US) LLP

(57) ABSTRACT

A system for minimizing movement of ice or snow along a surface of a vehicle. The system can include a plurality of stops configured to be individually mounted to the surface in a spaced apart manner, the surface comprising at least one of a roof, a trunk, or a hood of the vehicle. Each stop may include a base for mounting to the vehicle and a fin extending upwardly from the base, the fin having a substantially upright edge to at least partially define an abutment plane configured to face toward a center of the surface and limit motion of ice or snow remaining on the surface.

22 Claims, 9 Drawing Sheets

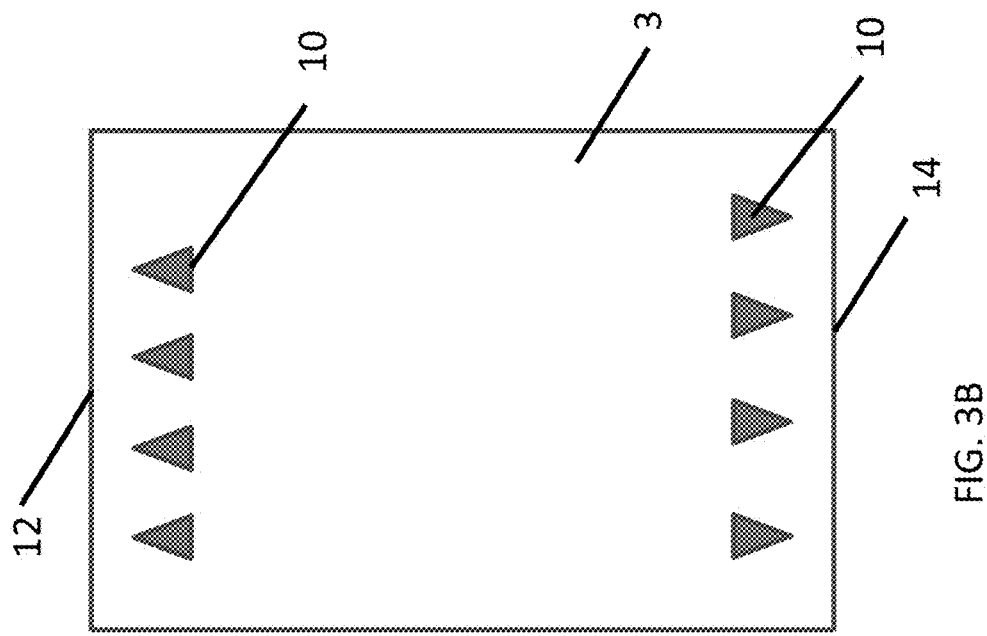
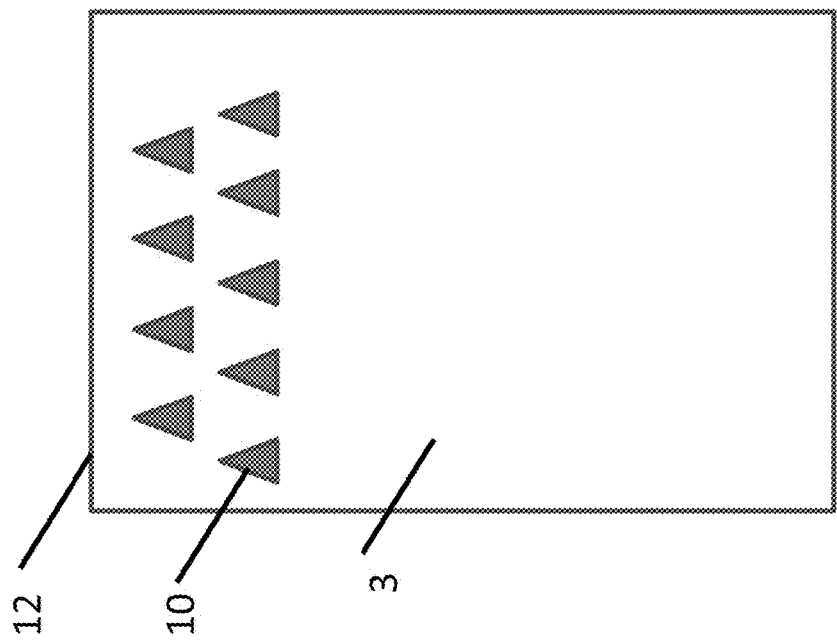
FIG. 3B
FIG. 3A

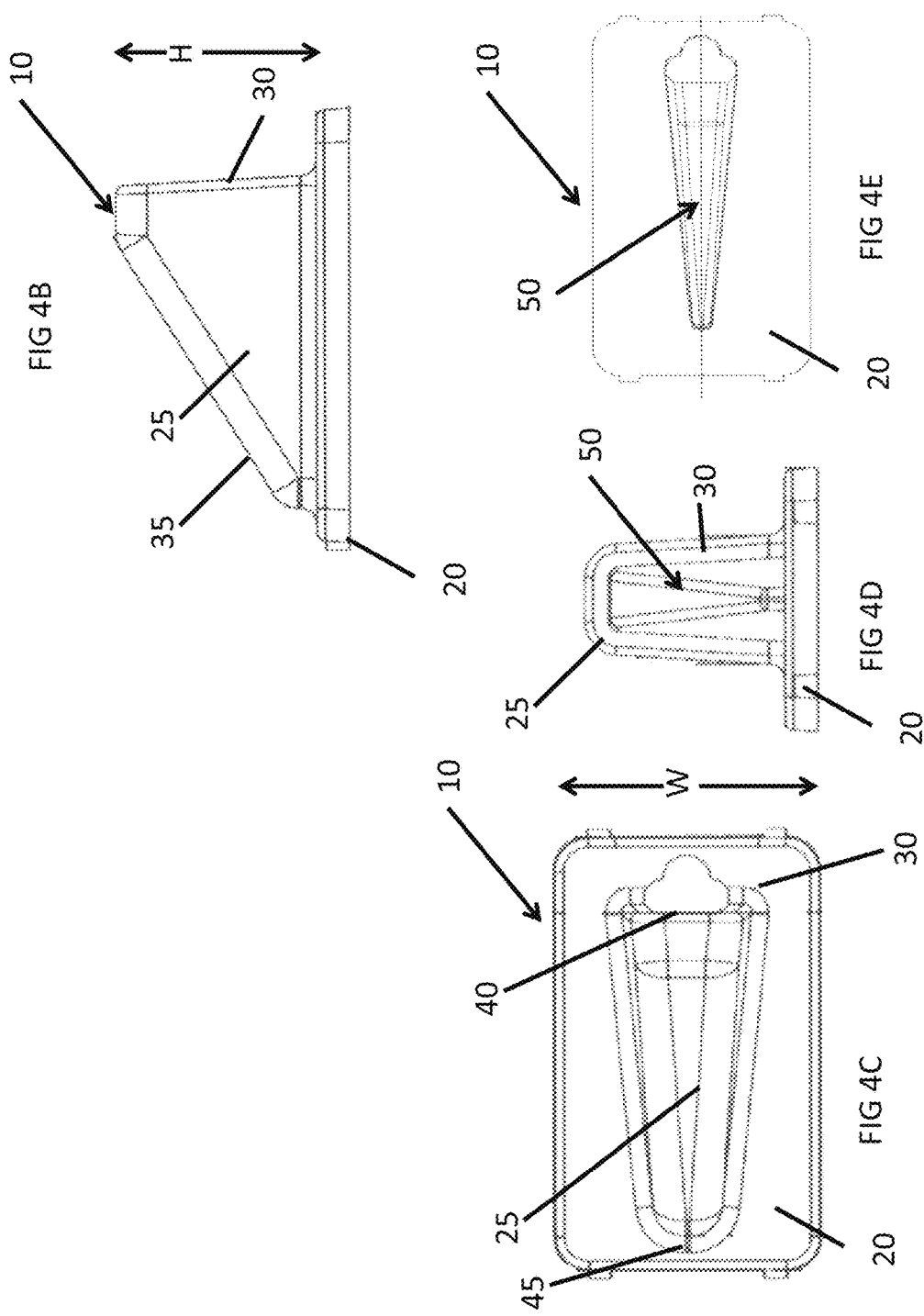

ICE AND SNOW RETENTION SYSTEM FOR VEHICLES

RELATED APPLICATION

This application is a continuation of U.S. application Ser. No. 14/737,089, filed on Jun. 11, 2015.

FIELD OF DISCLOSURE

The present disclosure relates to automobiles and transport trucks and particularly to accessories for automobiles and transport trucks that help retain debris on the tops thereof.

BACKGROUND

Where there is snow and ice, there are vehicles that become covered in snow and ice. Drivers are encouraged to completely remove any snow and ice from their vehicles prior to beginning their travels. All too often, however, the job of clearing the snow and ice is only half finished when the vehicle gets underway. Drivers may be in a hurry to get to their destination. Drivers may be unable to reach all portions of their vehicle. A layer of compact snow or ice may be missed if the top layer of loose snow was removed. As a result, drivers often clear the windshield and one or more windows, leaving some snow and ice sitting on the hood, trunk and especially the roof of their vehicles.

Every winter the National Transportation Safety Board warns of the dangers of packed ice on vehicle roofs causing hazardous situations. As the vehicle warms up and as the sun heats the paint on the vehicle, melting can occur. The layer of melted water reduces the friction between the vehicle and the snow or ice that was not removed by the driver. The remaining snow and ice is then able to slide relative to the vehicle. As the vehicle brakes, momentum causes the ice to slide forward, often down the windshield, potentially blocking the driver's view or damaging the hood of the vehicle. As the vehicle accelerates, momentum causes the ice to slide back, often dropping off the rear of the vehicle, possibly into the path of a trailing vehicle, which itself may become damaged.

There is a need for a system that is able to assist with the retention of snow and ice left on the top of a vehicle to help prevent the risk of damage that may result from the leftover snow and ice sliding around or being thrown from the vehicle during travel.

SUMMARY

The present disclosure includes a system for minimizing movement of ice or snow along a surface of a vehicle. The system can include a plurality of stops configured to be individually mounted to the surface in a spaced apart manner, the surface comprising at least one of a roof, a trunk, or a hood of the vehicle. Each stop may include a base for mounting to the vehicle and a fin extending upwardly from the base, the fin having a substantially upright edge to at least partially define an abutment plane configured to face toward a center of the surface and limit motion of ice or snow remaining on the surface.

The present disclosure also includes a kit. The kit may comprise a plurality of stops configured to be mounted to a surface of a vehicle in a spaced apart manner, the surface comprising at least one of a roof, a trunk, or a hood of the vehicle. Each stop may comprise a base for mounting to the vehicle and a fin extending upwardly from the base, the fin having a substantially upright edge to at least partially define an abutment plane configured to face toward a center of the surface and oppose motion of ice or snow left on the surface.

The present disclosure also includes a method to limit sheets of snow and ice from falling from a vehicle. The method may comprise the step of attaching a plurality of stops to a surface of the vehicle in a spaced apart manner, the surface comprising at least one of a roof, a trunk, and a hood of the vehicle. Each stop may comprise a base for mounting to the vehicle and a fin extending upwardly from the base, the fin having a substantially upright edge to at least partially define an abutment plane oriented to face toward a center of the surface and oppose motion of ice or snow left on the surface.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

BRIEF DESCRIPTION OF THE DRAWINGS

FIGS. 3A-3E schematically represent alternative patterns of stops used in the system of the present invention.

FIG. 4B shows a side view of one embodiment of a stop for use in the system of the present disclosure.

FIG. 4C shows a top view of one embodiment of a stop for use in the system of the present disclosure.

FIG. 4D shows a rear view of one embodiment of a stop for use in the system of the present disclosure.

FIG. 4E shows a bottom view of one embodiment of a stop for use in the system of the present disclosure.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

The present disclosure provides a system, a kit, and a method for retaining snow or ice upon the upper surfaces of a vehicle. Put another way, the present disclosure provides a system, a kit, and a method for limiting or minimizing the ability for snow or ice to slide or otherwise move upon the upper surfaces of a vehicle during travel.

Figure 1A:
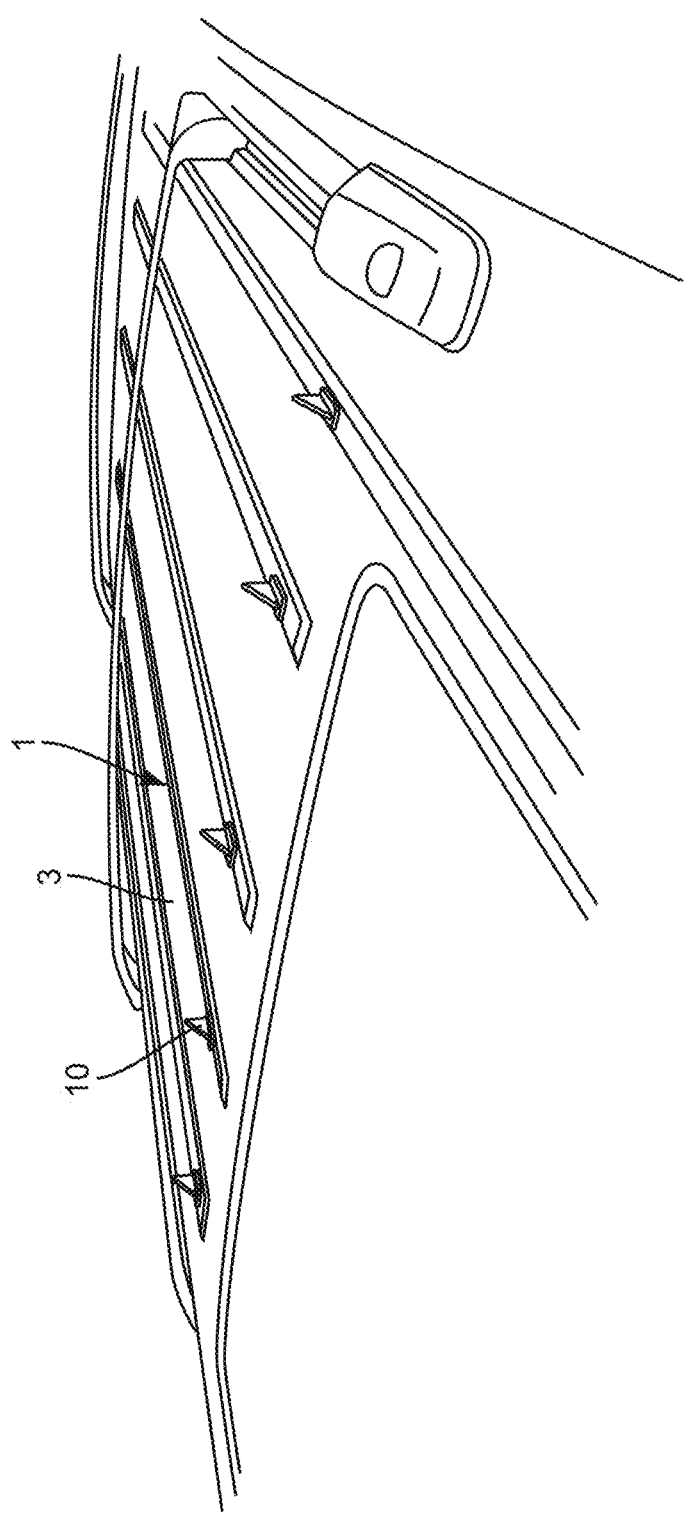
FIGS. 1A-1C show a vehicle outfitted with an embodiment of the system of the present disclosure applied to a roof, a hood, and a trunk of the vehicle respectively.
Figure 2:
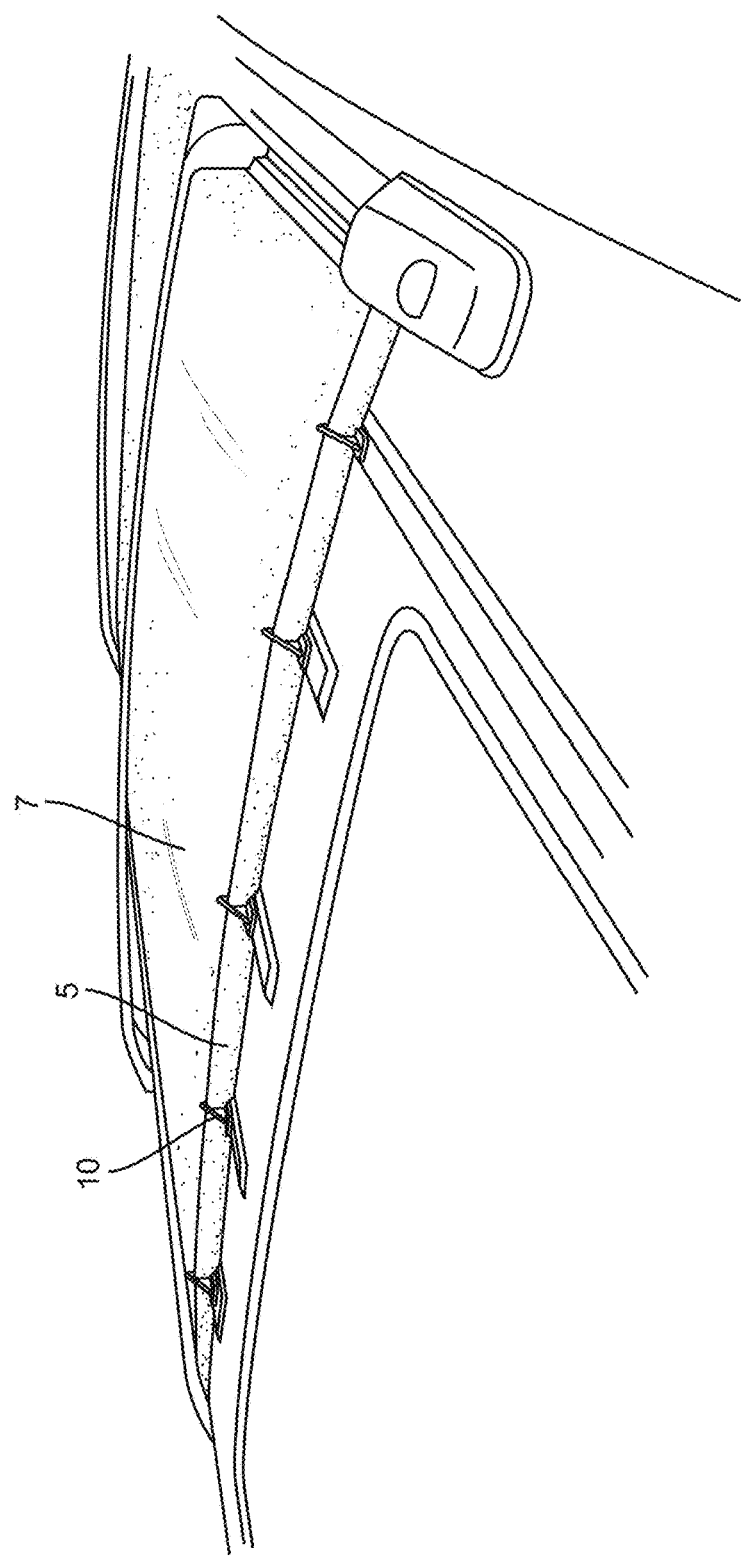
FIG. 2 shows an embodiment of the system of the present disclosure in use upon a vehicle.

FIG. 1A shows a vehicle 1 having a roof 3. The vehicle 1 is provided with one embodiment of the system of the present disclosure. The system may comprise an array of stops 10 configured to stop snow and ice from leaving the roof 3 in a given direction. The array of stops 10 also may prevent relatively large and intact sheets of snow and ice from sliding off the surface 3 of vehicle 1; rather, the array of stops cause any relatively large and intact sheet of snow or ice to break apart as the sliding sheet of snow or ice comes into contact with the array of stops 10. The array of stops 10 can have the cumulative effect of stopping sheets of ice or snow from sliding off of the vehicle 1, which uncontrolled, could damage the hood, obscure the driver's vision, or damage a following vehicle. As shown in FIG. 2 the array of stops 10 are intended to provide an abutment for an edge 5 of a sheet of ice 7.

Figure 1B:
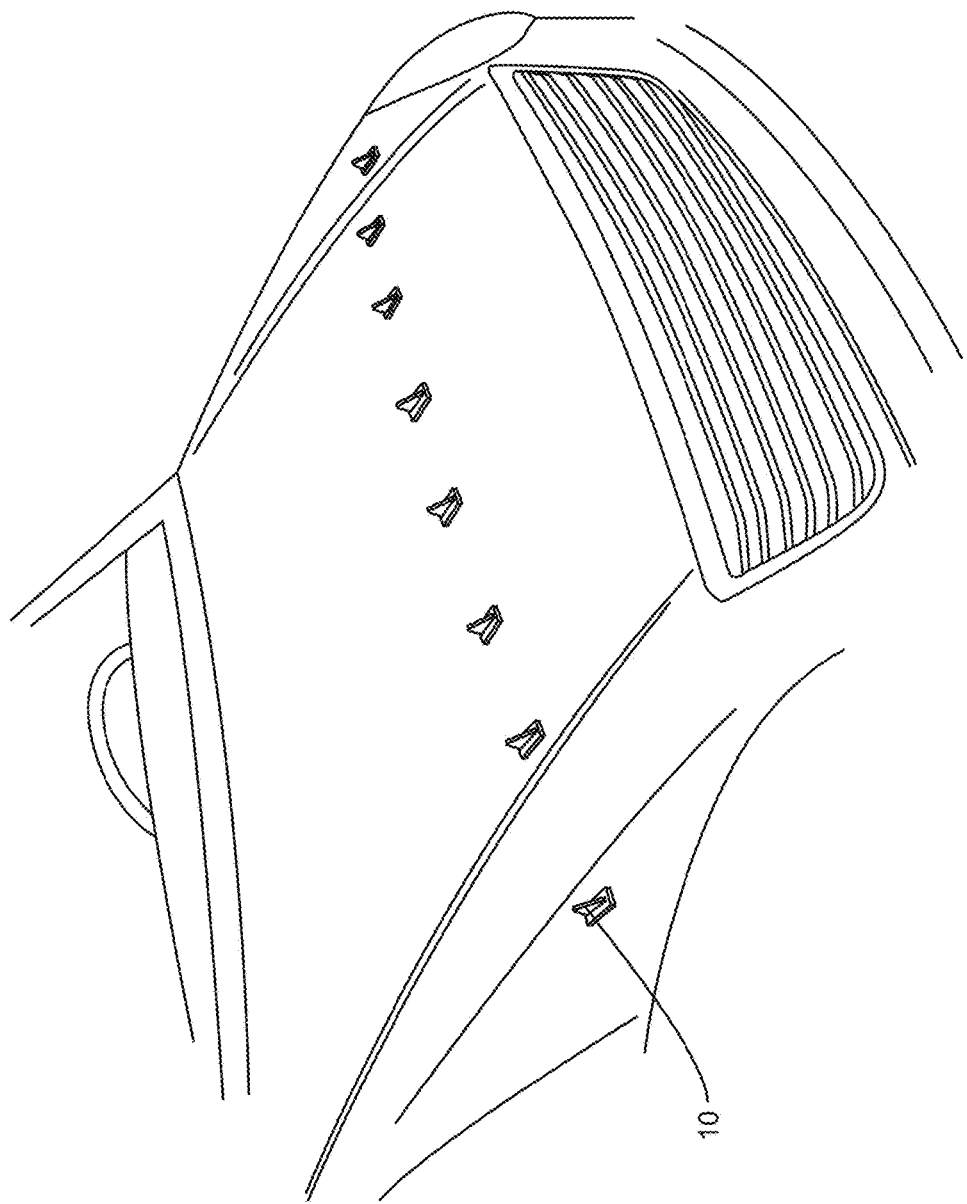
Figure 1C:
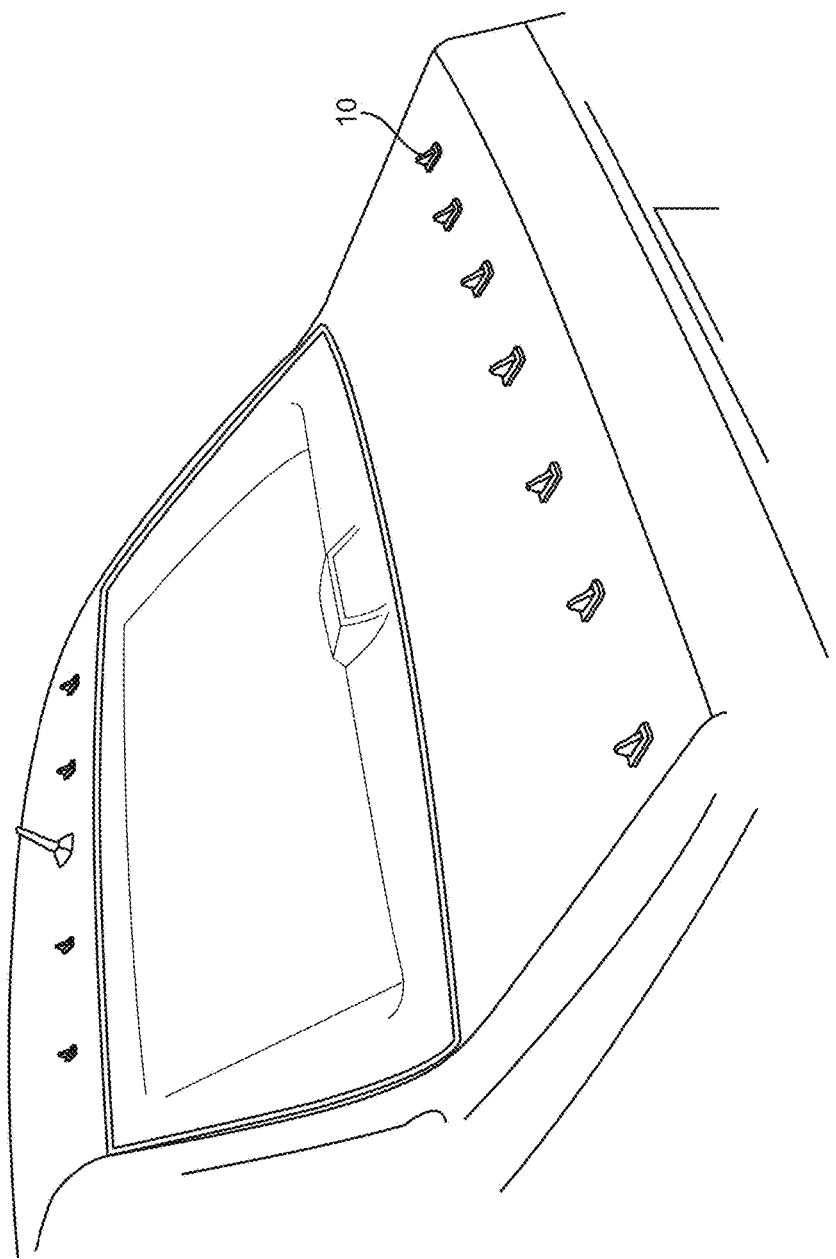

The present disclosure is not limited to a series of stops 10 located upon the roof 3 of a vehicle 1 as shown in FIG. 1A. Other upwardly facing support surfaces may also benefit from the system disclosed therein. Therefore, stops 10 may be added to the hood of a vehicle 1 as shown in FIG. 1B, the trunk of a vehicle 1 as shown in FIG. 1C, a bed of a pick-up truck, or a cover therefore. Vehicles that may benefit from the disclosed system may also include commercials trucks, such as tractor trailers. These trucks often have a large flat area on the top that is inconvenient to clear. Because the top of a semi-trailer is elevated higher than the roof of a passenger car, debris falling from a tractor trailer may cause even greater damage.

Figure 3C:
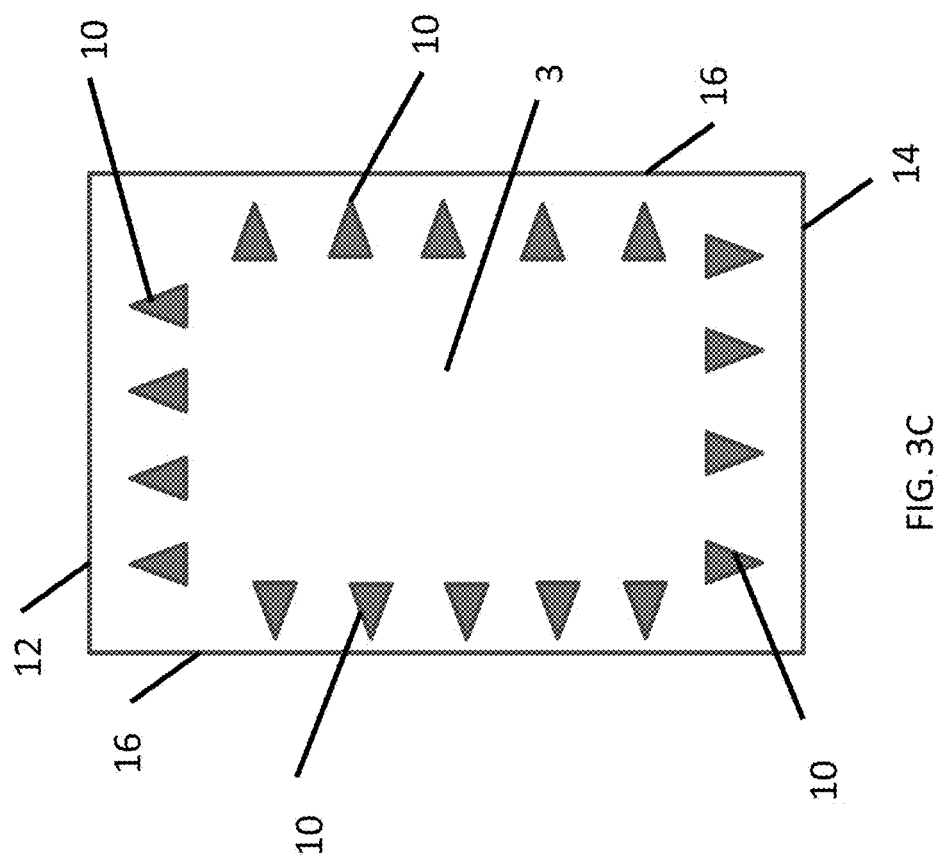

In the illustrated embodiment of FIG. 1A, the stops 10 are spaced apart to form a linear array near the front of the roof 3. In other embodiments, shown in FIGS. 3A-3C, the stops 10 may be arranged to form other patterns generally along a front 12 of a vehicle surface, such as the roof 3. For example, as shown in FIG. 3A, the stops 10 could be positioned along two rows, with the stops 10 along the first row staggered with respect to the stops 10 along the second row. From the top, this would create a single continuous W shaped line connecting each of the stops 10.

Figure 3E:
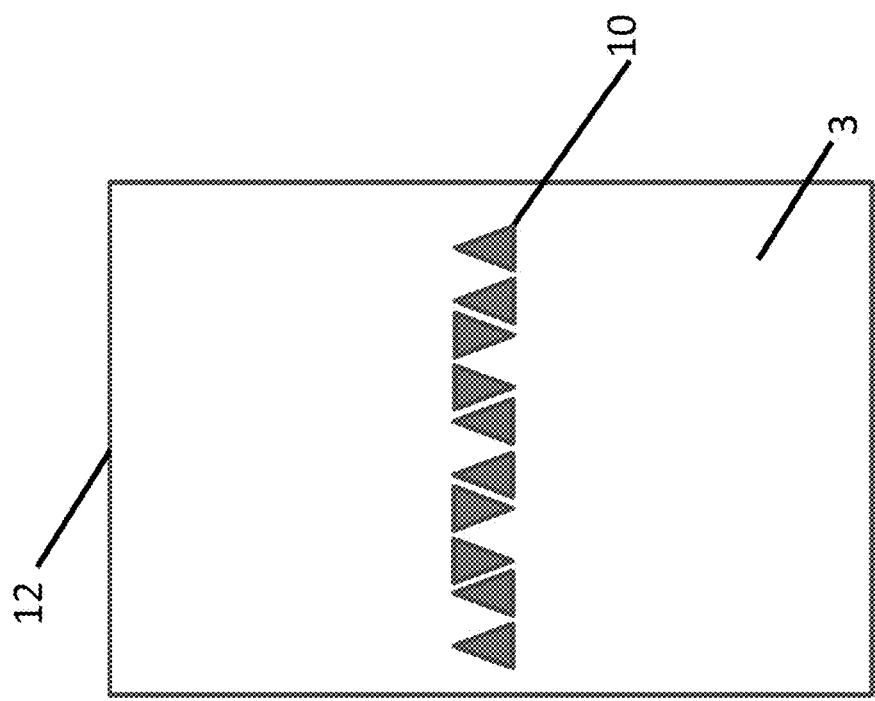
Figure 3D:
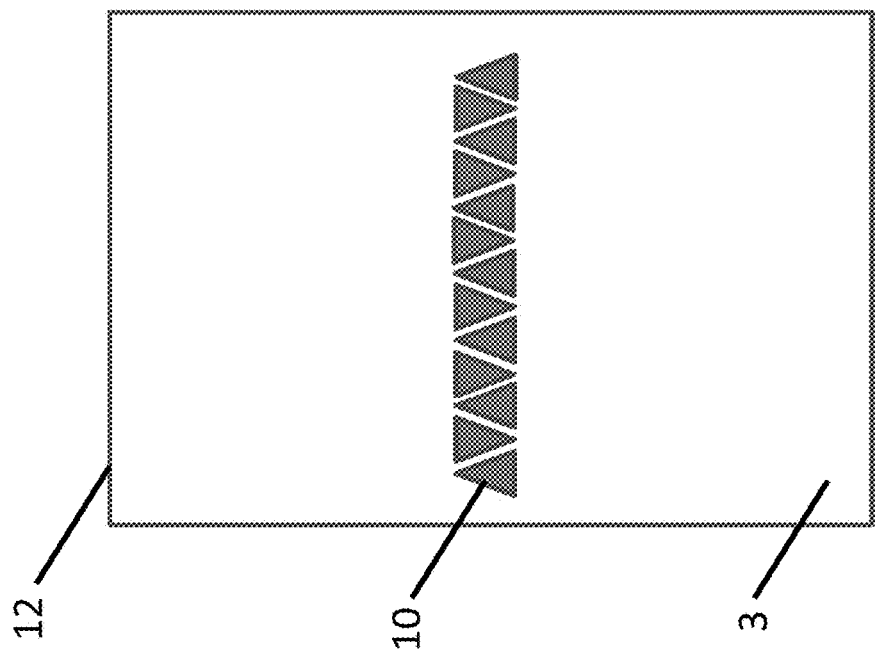
Figure 4A:
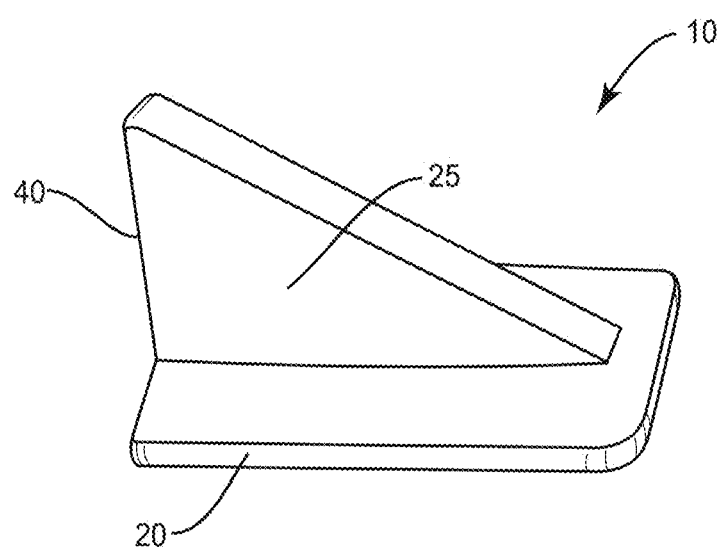
FIG. 4A shows a perspective view of one embodiment of a stop for use in the system of the present disclosure.

In other embodiments, as seen in FIG. 3B, the stops 10 also may be located near a rear 14 of the roof 3. FIG. 3B shows stops along both the front 12 and the rear 14, but a system with stops 10 only approximate the rear 14 is also contemplated. As seen in FIG. 3C, stops 10 may also be positioned near the sides 16 of the roof 3. Placement of stops 10 along the sides 16 may be useful to help prevent snow and ice from sliding off of the vehicle 1 during turning. Stops along the sides 16 may also help prevent snow and ice from falling upon a person entering or exiting the vehicle. For example, the act of opening or closing a vehicle door could dislodge a section of the ice that may be retained with assistance of the stops 10. Each of the illustrated embodiments positions the stops 10 relatively near an edge of the roof 3. As shown in FIGS. 3D and 3E, the stops 10 could, additionally or alternatively, be positioned relatively centrally upon the surface of roof 3. As shown in FIG. 3D the stops are arranged in a centrally located single row, with the abutment surface of adjacent stops facing in opposite directions. The pattern continues across the width of the surface of roof 3. Similarly, in FIG. 3E, the stops are also arranged in a centrally located single row with the abutment surfaces of the first two adjacent stops facing a first direction and the abutment surfaces of next two adjacent stops facing a second, opposite direction. Again, the pattern continues across the width of the surface of roof 3.

An example embodiment for each stop 10 may be best understood in view of FIGS. 4A-E. Each stop 10 may have an aerodynamic shape. Without an aerodynamic shape, the stops 10 may negatively affect the gas mileage of the vehicle 1, may be less aesthetically pleasing to the eye, may cause wind or vibration noise, and could be more susceptible to being detached from the vehicle 1 by air passing over the roof 3, for example. With this in mind, the stop 10 illustrated in FIGS. 4A-4E may be generally described as having a fin-like shape.

In the illustrated embodiment, the stop 10 has a base 20 that may be secured to the roof 3 by adhesive, double-sided tape, magnets, or other known removable fasteners. A suitable means for attaching each stop 10 to the roof 3 may be 3M® Mounting Tape enhanced by 3M® Plastic Emblem and Trim Adhesive. The base 20 may have a one-inch width. The width W of the base 20 may be selected to approximate the width of available double-sided tape for ease of manufacturing. The base 20 may be relatively wide and flat to provide a stable support surface for the stop 10. For whichever mounting method is selected, the stops 10 may be preferably mounted in a removable manner without damage to the vehicle 1. Therefore, if the ice or snow overcomes the system and one of the stops 10 becomes detached, the act of removing the stop 10 should not damage the surface of the vehicle 1, and stop 10 may be replaced. Using a removable attachment method also allows for the driver to vary the arrangement of the stops 10 based on the expected weather conditions. Further, mounting and removing the stops 10 should not interfere with the integrity of the roof 3 or the vehicle finish. Mounting and removing the stops 10 should preferably be easily accomplished by an average driver.

In other embodiments, the stops 10 of the present disclosure may be permanently mounted to a vehicle surface. In still further embodiments, stops 10 may be integrated into the fascia of the vehicle 1. In effect, the beneficial function provided by the system disclosed herein may be described as a vehicle having a generally horizontal exterior surface susceptible to accumulation of snow and ice, wherein the surface further comprises a plurality of spaced apart abutment surfaces standing substantially upright with respect to the horizontal surface. The abutment surfaces are arranged to face generally toward the center of the horizontal surface. Whether removably attached, permanently mounted, or integrated with the vehicle, the stops 10 can have a shape, size and appearance that does not detract from the vehicle's appearance. For example, the stops 10 may be colored to match the vehicle's paint. Therefore even if the stops 10 are applied as a removable after-market accessory, the stops 10 may appear as though they were included as original equipment.

Each stop 10 further comprises a fin 25 extending upwardly from the base 20. When viewed from the side, as seen in FIG. 4B, the fin 25 may have a generally triangular shape. In one embodiment the triangle is a right triangle having a substantially upright edge 30 and an angled edge 35.

The fin 25 may extend to a height H of one-inch above the base 20. The height of the fin 25 may vary. Drivers in heavy snow regions may prefer stops 10 with taller fins 25, and drivers in warmer weather areas may prefer stops 10 with shorter fins 25.

In the illustrated embodiment, the fin 25 has an optional tapered wedge shape when viewed from the top, as seen in FIG. 4C. The widest portion of the wedge may correspond at least partially with an abutment plane 40 corresponding with the upright edge 30. When mounted on the vehicle 1, the stop 10 may be arranged such that the abutment plane 40 faces generally toward a center region of the roof 3. The abutment plane 40 should be understood as facing toward the center region of the roof 3 without being exactly perpendicular to a radial line from a true center point of the roof 3. Therefore, it should be understood that in the top view, the tip 45 of the wedge pointed generally away from the center of the roof 3. Facing the relatively wide abutment plane 40 of each stop 10 toward the center presents a larger area to block the movement of the ice or snow. Retention of snow or ice may be increased by moving the stops 10 closer together. Thus, in climates with heavy ice and snow, the stops 10 may be placed close together, for example between about three and about twelve inches apart, preferably 9 inches apart. In areas with less snow and ice, the stops 10 may be spaced further apart, for example between about six and about twenty-four inches apart.

In one embodiment, the fin 25 may be formed with a hollowed cavity 50 therein, as represented in FIG. 4D, which presents a view facing the upright edge 30 of the stop 10. Use of a hollow fin 25 may aid in manufacturing or lower the costs of the stops 10. A hollow fin 25 may produce a crumple zone that could allow the fin 25 to be crushed under the weight of a vehicle tire. This could minimize the risk of a stop 10 presenting a puncture hazard if a stop 10 becomes detached from the roof 3 and lands in the roadway.

The array of spaced apart stops 10 may also result in breaking apart large sheets of ice or snow. The resulting fragmented sheets may pass between adjacent stops 10, but the smaller pieces may be less likely to cause significant harm as compared to the result of uncontrolled ice and snow.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A system for minimizing movement of ice or snow along a surface of a vehicle, comprising:
a plurality of stops configured to be mounted to the surface in a spaced apart manner, the surface comprising at least one of a roof, a trunk, or a hood of the vehicle,
each stop being individually mounted to the surface; and
each stop comprising:
a base for mounting to the vehicle, and
a fin extending upwardly from the base, the fin having a substantially upright edge to at least partially define an abutment plane configured to face toward a center of the surface and limit motion of ice or snow remaining on the surface.

2. The system of claim 1, wherein
the plurality of stops are arranged in at least two rows, the stops along a first row being staggered with respect to the stops along a second row.

3. The system of claim 1, wherein
the plurality of stops include at least a first row of stops arranged adjacent to a forward edge of the surface as defined with respect to the vehicle, and a second row of stops arranged adjacent to a rear edge of the surface as defined with respect to the vehicle; and
the abutment surfaces of the stops of the first row and the abutment surfaces of the stops of the second row are facing toward the center of the surface.

4. The system of claim 3, wherein
the plurality of stops includes a third row of stops arranged adjacent to a side edge of the surface as defined with respect to the vehicle; and
the abutment surfaces of the stops of the third row are facing toward the center of the surface.

5. The system of claim 1, wherein the fin is hollow.

6. The system of claim 1, wherein the base is configured to be adhered to the vehicle.

7. The system of claim 1, wherein the stops are spaced apart by a distance of between about three inches and about twenty-four inches.

8. The system of claim 1, wherein the fin has a triangular shape from a side view.

9. A kit comprising:
a plurality of stops configured to be mounted to a surface of a vehicle in a spaced apart manner, the surface comprising at least one of a roof, a trunk, or a hood of the vehicle,
each stop configured to be individually mounted to the surface; and
each stop comprising:
a base for mounting to the vehicle, and
a fin extending upwardly from the base, the fin having a substantially upright edge to at least partially define an abutment plane configured to face toward a center of the surface and oppose motion of ice or snow left on the surface.

10. The kit of claim 9, wherein the fin is hollow.

11. The kit of claim 9, wherein the base includes adhesive to be mounted to the vehicle.

12. The kit of claim 9, wherein the kit comprises a sufficient quantity of stops to provide at least 2 rows of stops, wherein the stops are spaced apart by a distance of between about three inches and about twenty-four inches.

13. The kit of claim 9, wherein the kit comprises a sufficient quantity of stops to provide at least two rows of stops across a full width of the vehicle when the stops are spaced apart by a distance of between about three inches and about twenty-four inches.

14. The kit of claim 13, wherein the kit comprises a sufficient quantity of stops to provide at least two rows of stops across a full width of the vehicle when the stops are spaced apart by a distance of between about three inches and about twelve inches.

15. The kit of claim 9, wherein the fin has a triangular shape from a side view.

16. A method to limit sheets of snow and ice from falling from a vehicle, comprising:
providing a plurality of stops to a surface of the vehicle in a spaced apart manner, the surface comprising at least one of a roof, a trunk, and a hood of the vehicle,
each stop being configured to be individually mounted to the surface; and
wherein each stop comprises:
a base; and
a fin extending upwardly from the base, the fin having a substantially upright edge to at least partially define an abutment plane oriented to face toward a center of the surface and oppose motion of ice or snow left on the surface.

17. The method of claim 16, wherein the step of providing includes:
arranging the plurality of stops in at least two rows, the stops along a first row being staggered with respect to the stops along a second row.

18. The method of claim 16, wherein the step of providing includes:

arranging the plurality of stops in a first row adjacent to a forward edge of the surface as defined with respect to the vehicle;

arranging a second row of stops adjacent to a rear edge of the surface as defined with respect to the vehicle; and arranging each of the stops of the first row and each of the stops of the second row so that the abutment faces of each of the stops of the first row and the abutment faces of each of the stops of the second row are facing toward the center of the surface.

19. The method of claim 18, wherein the step of providing further includes:

arranging a row of stops adjacent to a side edge of the surface as defined with respect to the vehicle; and arranging each of the stops of the third row so that the abutment faces of each of the stops of the third row are facing toward the center of the surface.

20. The method of claim 16, wherein the step of providing includes:

adhering the base to the vehicle or using magnets to secure the base to the vehicle.

21. A system for minimizing movement of ice or snow along a surface of a vehicle, comprising:

a plurality of stops arranged in a spaced apart manner along the surface, the surface comprising at least one of a roof, a trunk, or a hood of the vehicle, each stop comprising:

a fin extending upwardly relative to the surface, the fin having a substantially upright edge to at least partially define an abutment plane configured to face toward a center of the surface and limit motion of ice or snow remaining on the surface.

22. A system for minimizing movement of ice or snow along a surface of a vehicle, comprising:

at least one stop arranged on the surface without detracting from the appearance of the surface, the surface comprising at least one of a roof, a trunk, or a hood of the vehicle, the at least one stop comprising:

a fin extending upwardly relative to the surface, the fin having a substantially upright edge to at least partially define an abutment plane configured to face toward a center of the surface and limit motion of ice or snow remaining on the surface.

* * * * *